F. NEWTON.
DRIVING AND CONTROL MECHANISM, PARTICULARLY FOR PLANING MACHINES.
APPLICATION FILED NOV. 16, 1920.

1,379,833.

Patented May 31, 1921.
3 SHEETS—SHEET 1.

Fig:1.

INVENTOR.
Frederick Newton.
By
Attorney

F. NEWTON.
DRIVING AND CONTROL MECHANISM, PARTICULARLY FOR PLANING MACHINES.
APPLICATION FILED NOV. 16, 1920.

1,379,833.

Patented May 31, 1921.
3 SHEETS—SHEET 2.

INVENTOR
Frederick Newton.
By
Attorney.

F. NEWTON.
DRIVING AND CONTROL MECHANISM, PARTICULARLY FOR PLANING MACHINES.
APPLICATION FILED NOV. 16, 1920.

1,379,833.

Patented May 31, 1921.
3 SHEETS—SHEET 3.

INVENTOR
Frederick Newton.
By
Attorney.

UNITED STATES PATENT OFFICE.

FREDERICK NEWTON, OF DERBY, ENGLAND.

DRIVING AND CONTROL MECHANISM, PARTICULARLY FOR PLANING-MACHINES.

1,379,833.  Specification of Letters Patent.  Patented May 31, 1921.

Application filed November 16, 1920. Serial No. 424,543.

*To all whom it may concern:*

Be it known that I, FREDERICK NEWTON, a subject of the King of Great Britain and Ireland, residing at Alfreton Road, Derby, England, have invented new and useful Improvements in Driving and Control Mechanism, Particularly for Planing-Machines, of which the following is a specification.

This invention relates to an improved reversing reduction gearing especially for driving planing machines and like reciprocating machines which require to move at different speeds in the two directions of travel. The gearing is a combination of two epicyclic gears, each comprising a sun wheel, a set of planet pinions, and an internally toothed ring. The two internally toothed rings are united, and the sun wheel of one gear is made fast to the planet pinion carrier of the other. To bring about the reversal of drive and change in gear ratio required for the reciprocation of a planer table, the united internally toothed rings are fitted with a brake surface, to which a brake may be applied to hold them still; and the joined sun wheel and planet carrier are similarly fitted.

The application and release of these brakes may be effected automatically by the planer table, through either electromagnetic or mechanical actuating devices. In a preferred arrangement each brake is equipped with a spring by which it is applied, and with a trigger by which its spring may be held compressed and inoperative. The planer table at each end of its stroke compresses the one spring so that it may be engaged by its trigger, and releases the trigger of the other, so causing the release of one brake and the application of the other.

The invention is illustrated in the accompanying drawings in which.

Figure 1:
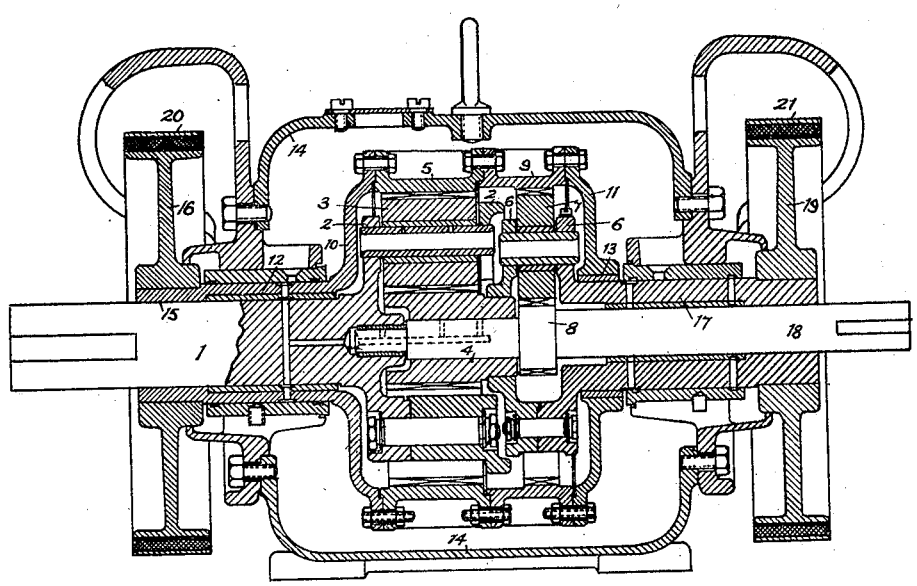
Figure 1 is a longitudinal section through a preferred construction of gearing.

In the construction of Fig. 1 the shaft 1 bears the planet pinion carrier 2, in which are mounted planet pinions such as 3, meshing on the one hand with a sun wheel 4 and on the other with an internally toothed ring 5. To the sleeve hub of the sun wheel 4 is secured the planet carrier 6 of a second epicyclic gear, having planet pinions such as 7 meshing with a sun wheel 8 and an internally toothed ring 9. The two internally toothed rings 5 and 9 are mechanically united, for instance they may be integral, or, as shown, bolted together. End plates 10 and 11 attached to the rings provide journal bearings 12, 13, for them upon the shafts which the gearing joins. The gearing is inclosed by a casing 14. The planet carrier 6 is integral with a sleeve 17 having a journal bearing on the shaft 18 of the sun wheel 8. Suitable brakes and brake surfaces are provided by means of which the parts 5, 9, or the parts 2, 6 may be arrested and held stationary. For example in the construction illustrated the sleeve extension 15 of the end plate 10 carries outside the casing a brake drum 16; and the sleeve 17 carries outside the casing 14 a brake drum 19. Around the brake drums are band brakes 20, 21.

If the brake 20 is applied to its drum so that the internally toothed rings 5 and 9 are held still, rotation of the shaft 18 by any suitable motor will cause the shaft 1 to rotate in the same direction but at a much lower speed. By suitable design of the relative sizes of the sun wheel, internally toothed rings, and planet pinions, any desired reduction ratio may be obtained, appropriate, for instance, to the driving of a planer table on its cutting stroke from, say, an electric motor. If the brake 20 is released and the brake 21 applied, the shaft 18 continuing to rotate in the same direction, the shaft 1 will be driven in the reverse direction, but at a much higher speed than before, though still at a reduced speed as compared with the shaft 18.

By the use of double planet pinions, *i. e.* two pinions of different diameter upon a common spindle, one meshing with the sun-wheel and the other with the internally toothed ring, gears may be designed for a wide range of speed ratios within narrow limits of internal diameter.

The gearing is therefore suitable for a wide range of purposes; for instance, in ship propulsion, or in the driving of mixing machines, or in any other case where considerable power is to be transmitted, and a reversible driven shaft has to be rotated at a widely different speed from that of the driving shaft. But it is especially applicable to the driving of planer machines, and like reciprocating machines, where the driven member is required frequently to reverse its direction of movement and to travel at different speeds in two directions; for this is the effect obtained in alternate application of the two brakes. Moreover it will be noted that the planet carrier 2 and planet pinions 3 are the only parts of the gearing which reverse their motion; the planet carrier 6, and the internally toothed rings 5 and 9 have only to be stopped or started; all these parts are slow moving parts, and therefore the inertia of the gearing is small.

In the case of a planing or like machine, it is convenient to cause the reversal of the gearing to be effected automatically by the reciprocating part of the machine. To this end the planer table or like part of the machine is caused to apply one of the brakes and release the other at each end of its stroke.

Figure 2:
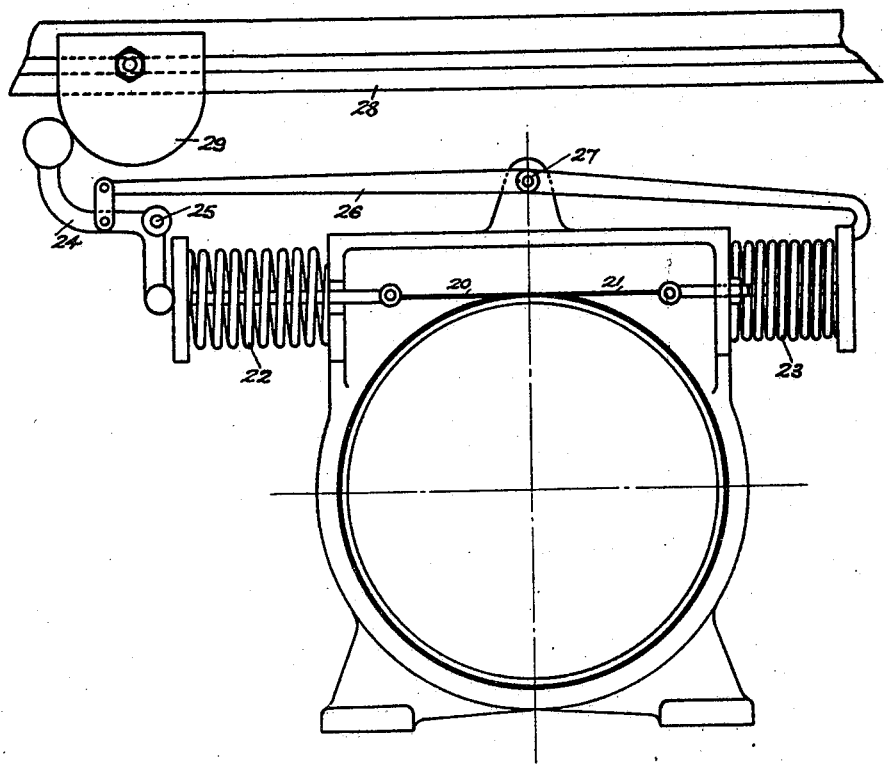
Fig. 2 illustrates diagrammatically the mechanical actuation of the gearing by a planer table.

A mechanical contrivance for this purpose is shown in part in Fig. 2. To each of the brakes 20, 21 is attached a spring, 22, 23 respectively, which tends to put the brake on. A bell crank lever 24, pivoted at 25, is in position when rocked to compress the spring 22. Linked to the bell crank there is a trigger 26, pivoted at 27 and adapted to engage behind the spring 23 when it is compressed so as to hold it compressed as indicated in the figure. There is a second bell crank lever, omitted from the drawing for the sake of clearness, which when rocked compresses the spring 23; and with this lever is connected a second trigger in position to engage and hold the spring 22 when it is compressed. 28 indicates the planer table, upon which are adjustable stops such as 29, in position to engage the bell crank levers 24 during reciprocation.

In the position shown in the drawing, the brake 20 is applied and the planer table is moving in the direction of the arrow and is near the end of its stroke. The stop 29 is beginning to bear on the lever 24 and so to compress the spring 22 and release the brake 20. The movement of the bell crank also rocks the trigger 26, and by the time the brake 20 is fairly slackened, the trigger will release the spring 23 and brake 21 will at once be applied. The action is rapid and the arrest and reversal of the table is prompt, so that the length of stroke of the table does not vary from stroke to stroke.

Figure 3:
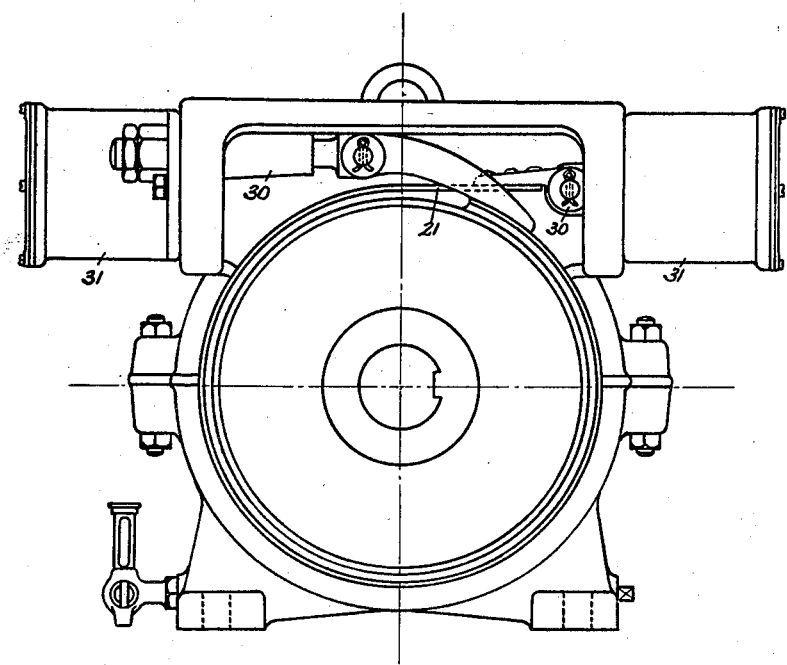
Fig. 3 illustrates the alternative electromagnetic apparatus for actuating the gearing.

This contrivance for automatically changing the gear is described as an example only. Instead of the planer table thus operating the mechanism, any part moving with the table will serve the purpose; and it may be convenient to have the operating stops upon a central control apparatus driven with the table. In Fig. 3 an electromagnetic device for controlling the brakes is shown. Each brake band in this case is attached to the core 30 of the electromagnet 31, and the two electromagnets are put into circuit and thrown out of circuit alternately by switches operated by stops such as 29 upon the planer table or by a central control mechanism. A suitable switch actuating device for the purpose is described in British patent specification No. 22893 of 1914.

Figure 4:
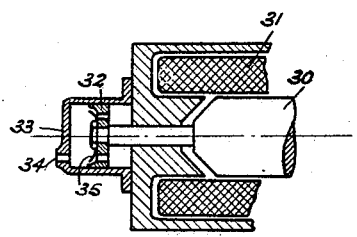
Fig. 4 is a detail of a modification of the actuating apparatus.

In case the application of the brakes whether by the contrivance illustrated in Fig. 2 or by that of Fig. 3, is too violent, the action may be delayed by a dash-pot. This modification is illustrated in Fig. 4 as applied to the electromagnet core. There is attached to the core a piston 32 moving in a cylinder 33 from which oil or other fluid can be ejected, but only slowly, through an orifice 34. A one-way valve 35 in the piston prevents any retardation of its motion in the opposite direction; so that the brake is still released quickly, though it is applied more gradually.

The mechanism by which the brake is applied, whether mechanical or electrical, may be combined with or interlocked with means for varying the speed of the driving motor. For instance, in the case of an electric motor, additional stops upon the planer bed may bring about the insertion of resistance into the circuit in one or more steps.

What I claim is:

1. A reversing reduction gearing consisting of two epicyclic gears each comprising a sun pinion, a set of planet pinions, and an internally toothed ring, said internally toothed rings being mechanically united, means connecting the planet pinion carrier of one gear with the sun wheel of the other, and means for braking the internally toothed rings or said connected planet pinion carrier and sun wheel.

2. In a reciprocating machine the combination with the reciprocating part of the machine, of a driving shaft, a reversing reduction gearing as claimed in claim 1 transmitting motion from said driving shaft to said reciprocating part, and means operated by the movement of said reciprocating part for applying and releasing the brakes of said gearing.

3. The combination with a reciprocating machine and reversing and reduction gearing for driving the same as claimed in claim 2 of springs tending to apply the brakes of said gearing, triggers for holding said springs out of action, and means operated by the movement of said reciprocating part for compressing said springs alternately, and alternately releasing said triggers.

In testimony whereof I have signed my name to this specification.

FREDERICK NEWTON.